(12) United States Patent
Konishi (10) Patent No.: US 9,137,834 B2
(45) Date of Patent: Sep. 15, 2015

(54) TRANSMITTING APPARATUS

(71) Applicant: ONKYO CORPORATION, Osaka (JP)

(72) Inventor: Tomohito Konishi, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 207 days.

(21) Appl. No.: 13/886,416

(22) Filed: May 3, 2013

(65) Prior Publication Data

US 2013/0303078 A1 Nov. 14, 2013

(30) Foreign Application Priority Data

May 11, 2012 (JP) ................................. 2012-109775

(51) Int. Cl.
 *H04W 76/02* (2009.01)
 *H04W 12/06* (2009.01)

(52) U.S. Cl.
 CPC ............ *H04W 76/022* (2013.01); *H04W 12/06* (2013.01)

(58) Field of Classification Search
 CPC ..... H04W 12/06; H04W 12/00; H04W 12/04; H04W 12/08; H04W 12/10; H04W 12/12; H04W 76/023; H04W 76/022; H04W 76/025; H04W 76/026; H04W 76/028; H04W 76/04; H04W 76/041; H04W 76/043
 USPC ............. 455/7, 91, 3.01, 3.05, 3.06, 24, 41.2, 455/500, 552.1; 725/81; 348/723; 370/252, 370/342, 329, 280, 240.01, 349, 437; 375/260; 386/94
 See application file for complete search history.

(56) References Cited

U.S. PATENT DOCUMENTS

| | | | |
|---|---|---|---|
| 2002/0010915 A1* | 1/2002 | Maeda | 717/11 |
| 2008/0056393 A1* | 3/2008 | Niu et al. | 375/260 |
| 2008/0192726 A1* | 8/2008 | Mahesh et al. | 370/349 |
| 2008/0225819 A1* | 9/2008 | Niu et al. | 370/342 |
| 2008/0240031 A1* | 10/2008 | Nassiri-Toussi et al. | 370/329 |
| 2008/0250294 A1* | 10/2008 | Ngo et al. | 714/752 |
| 2009/0061795 A1* | 3/2009 | Doan et al. | 455/91 |
| 2009/0260043 A1* | 10/2009 | Tatsuta et al. | 725/81 |
| 2010/0067393 A1* | 3/2010 | Sakimura et al. | 370/252 |
| 2010/0217990 A1* | 8/2010 | Abe et al. | 713/176 |

(Continued)

FOREIGN PATENT DOCUMENTS

| | | |
|---|---|---|
| JP | 2000-174797 A | 6/2000 |
| JP | 2010-213190 | 9/2010 |

(Continued)

*Primary Examiner* — Tan Trinh
(74) *Attorney, Agent, or Firm* — Renner, Otto, Boisselle & Sklar, LLP (57) ABSTRACT

An aspect of the present invention provides a transmitting apparatus that reduces a transmission delay of content data in transmitting the content data transmitted from a source device to a receiving apparatus. A first repeater device is a transmitting apparatus in conformity to a Wireless HD. A BD player is in conformity to an HDMI. The first repeater device receives uncompressed content data transmitted from the BD player. Before receiving the content data from the BD player, the first repeater device performs authentication processing between the BD player and the first repeater device based on an HDCP. Before the authentication processing is ended, the first repeater device starts processing of establishing a communication channel from the first repeater device to a second repeater device using an LRP. The first repeater device transmits the content data transmitted from the BD player to the second repeater device through the established communication channel.

5 Claims, 5 Drawing Sheets

(56) References Cited

U.S. PATENT DOCUMENTS

2010/0220977 A1* 9/2010 Kwon et al. .................. 386/94
2011/0285917 A1* 11/2011 Murase et al. ............... 348/723
2012/0002681 A1   1/2012 Inohisa et al.

FOREIGN PATENT DOCUMENTS

| JP | 2011-023822 | 2/2011 |
| JP | 2011-061472 | 3/2011 |
| WO | WO 2007/037379 A1 | 4/2007 |

\* cited by examiner

ADDRESS MANAGEMENT TABLE 70

| STID | HDMI LOGICAL ADDRESS | HDMI PHYSICAL ADDRESS |
|---|---|---|
| 11 (REPEATER DEVICE 2) | 21 (TELEVISION SET 200) | 0.0.0.0 (TELEVISION SET 200) |
| 12 (REPEATER DEVICE 1) | 22 (BD PLAYER 100) | 1.1.0.0 (BD PLAYER 100) |

FIG. 5

TRANSMITTING APPARATUS

BACKGROUND OF THE INVENTION

1. Field of the Invention

The present invention relates to a transmitting apparatus, more particularly to a transmitting apparatus that uses wireless communication to transmit content data transmitted from a source device to a receiving apparatus.

2. Description of the Related Art

An HDMI (High-Definition Multimedia Interface) is a standard that can transfer uncompressed content data to sink devices such as a television set from source devices such as a BD (Blu-ray Disc) player. A user connects the sink device to the source device with an HDMI cable to allow a high-quality video image to be displayed on the sink device. However, the connection of the source device and the sink device with the HDMI cable restricts places where the devices are installed.

Therefore, it is conceivable that the uncompressed content data is transmitted by wireless communication. Japanese Patent Publication Laid-Open Nos. 2010-213190, 2011-61472, and 2011-23822 disclose a technology of transmitting the uncompressed content data by a wireless communication standard called a Wireless HD.

In Japanese Patent Publication Laid-Open Nos. 2010-213190, 2011-61472, and 2011-23822, a transmission node and a reception node are in conformity to the Wireless HD. The transmission node transmits the uncompressed content data from a data source to the reception node using a communication system called an HRP (High-rate physical layer). The reception node transmits the uncompressed content data transmitted from the transmission node to a display. The transmission node and the reception node transmit control information using a communication system called a LRP (Low-rate physical layer).

The transmission node establishes a communication channel by the HRP in the case where the uncompressed content data is transmitted using the HRP. In the case where the data source transmits the uncompressed content data to the transmission node in conformity to the HDMI, the communication channel is established after authentication processing is ended between the data source and the transmission node based on HDCP (High-bandwidth Digital Content Protection). The data source starts the transmission of the uncompressed content data after the authentication processing. However, the transmission node cannot transmit the uncompressed content data to the reception node unless the communication channel is established by the HRP. As a result, a transmission delay of the uncompressed content data is generated in the transmission node.

SUMMARY OF THE INVENTION

An object of the present invention is to provide a transmitting apparatus that reduces the transmission delay of the content data in transmitting the content data transmitted from the source device to the receiving apparatus.

A transmitting apparatus according to the present invention transmits data to a receiving apparatus using first and second wireless communications. The transmitting apparatus according to the present invention comprises a receiver, an authentication unit, a channel establishing unit and a transmitter. The receiver receives content data transmitted from a source device in conformity to a predetermined standard. The authentication unit performs authentication processing between the source device and the transmitting apparatus in order to receive the content data from the source device. The channel establishing unit starts processing of establishing a communication channel from the transmitting apparatus to the receiving apparatus by the second wireless communication using the first wireless communication before the authentication unit ends the authentication processing. The transmitter transmits the content data received by the receiver to the receiving apparatus through the communication channel established by the channel establishing unit.

In the transmitting apparatus of the first aspect of the present invention, before the authentication processing is ended between the source device and the transmitting apparatus, the processing of establishing the communication channel from the transmitting apparatus to the receiving apparatus by the second wireless communication is started using the first wireless communication. Therefore, a time from when the authentication processing is ended to when the content data is transmitted through the communication channel can be shortened.

Preferably, the processing of establishing the communication channel is performed in parallel with the authentication processing performed by the authentication unit.

In the transmitting apparatus of the first aspect of the present invention, the time from when the authentication processing is started to when the transmission of the content data is started can further be shortened by concurrently performing the authentication processing and the processing of establishing the communication channel.

Preferably, the channel establishing unit includes a flag setting unit. The flag setting unit sets a completion flag indicating the establishment of the communication channel when the establishment of the communication channel is completed. The transmitter starts the transmission of the content data through the communication channel when the flag setting unit sets the completion flag.

The transmitter can quickly determine whether the transmission of the content data can be started by the flag setting unit setting the completion flag.

Preferably, the source device transmits the content data to the transmitting apparatus while synchronizing the content data with a clock signal. The receiver includes a synchronous circuit. The synchronous circuit generates a signal synchronized with the clock signal before the source device transmits the content data. The channel establishing unit starts the establishment of the communication channel when the signal output from the synchronous circuit is synchronized with the clock signal.

The synchronous circuit generates the signal synchronized with the clock signal, which allows the transmitting apparatus to acquire the information on the content data. Accordingly, when the synchronous circuit generates the signal synchronized with the clock signal, the communication channel can quickly be established based on the information on the acquired content data.

The transmitting apparatus controlling method of the second aspect of the present invention is adopted to operate the transmitting apparatus of the first aspect of the present invention. The program of the third aspect of the present invention is used in the transmitting apparatus of the first aspect of the present invention.

DETAILED DESCRIPTION OF THE PREFERRED EMBODIMENT

Hereinafter, a preferred embodiment of the present invention will be described with reference to the drawings. In the drawings, the identical or equivalent component is designated by the identical numeral, and the overlapping description is omitted.

(Configuration of Content Transfer System)

Figure 1:
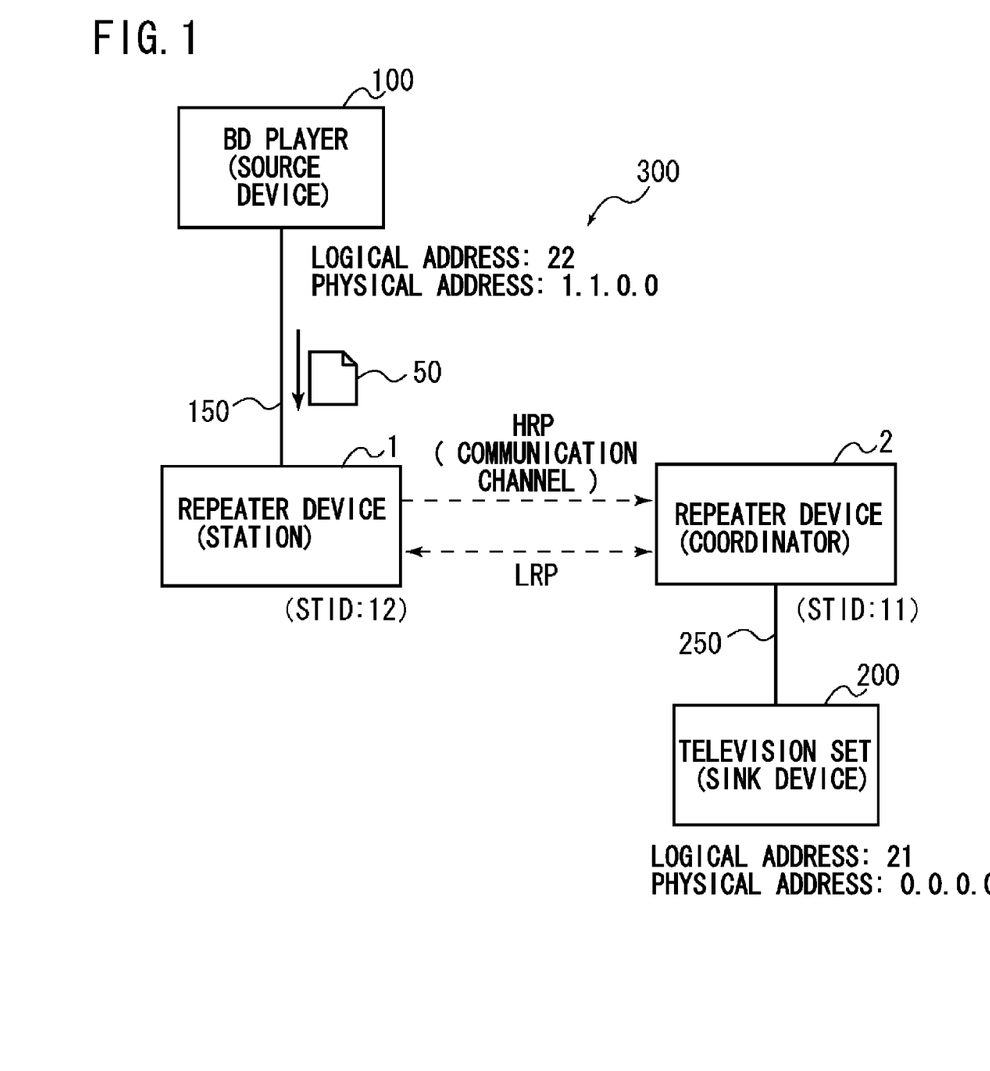
FIG. 1 is a functional block diagram illustrating a configuration of a content transfer system according to an embodiment of the present invention.

FIG. 1 is a functional block diagram illustrating a configuration of a content transfer system 300 according to an embodiment of the present invention. Referring to FIG. 1, the content transfer system 300 includes repeater devices 1 and 2, a BD player 100, and a television set 200. The BD player 100 is connected to the repeater device 1 with an HDMI cable 150. The television set 200 is connected to the repeater device 2 with an HDMI cable 250. The repeater device 1 is a transmitting apparatus that transmits content data 50 to the repeater device 2 by communication in conformity to the Wireless HD (hereinafter referred to as the "WiHD"). The repeater device 2 is a receiving apparatus that receives the content data 50 by communication in conformity to the WiHD.

In the content transfer system 300, the BD player 100 is a source device in conformity to the HDMI. The BD player 100 plays back a content recorded in a BD disc (not illustrated), and generates the uncompressed content data 50. The content data 50 is transmitted to the repeater device 1 through the HDMI cable 150.

The repeater device 1 corresponds to a station in the WiHD. Frequently the station is connected to the source device to transmit the content data 50 to a coordinator. The repeater device 1 establishes a communication channel 60 between the repeater devices 1 and 2 using the HRP, and transmits the content data 50 to the repeater device 2 through the communication channel 60. The detailed communication channel 60 is described later.

The repeater device 2 corresponds to the coordinator in the WiHD. The coordinator is a device that manages a home network called a WVAN (Wireless Video Area Network) in the WiHD, and frequently is connected to the sink device. The repeater device 2 transmits the content data 50, which is transmitted through the communication channel 60, to the television set 200 through the HDMI cable 250. Therefore, the television set 200 can display the content based on the content data 50 generated by the BD player 100.

The repeater devices 1 and 2 in conformity to the WiHD use two communication systems called the HRP and LRP. The HRP is a unidirectional communication, and is used to transfer large-capacity data (such as the content data 50). The repeater device 1 controls antenna directivity of the repeater device 1 in the case where the content data 50 is transmitted to the repeater device 2 using the HRP. This enables the HRP to transfer the large-capacity data. The LPR is bidirectional communication, and conducts communication slower than the HRP. The LRP is used to transfer control information on the WVAN or control information on communication in which the HRP is used.

(Configuration of Repeater Device 1)

Figure 2:
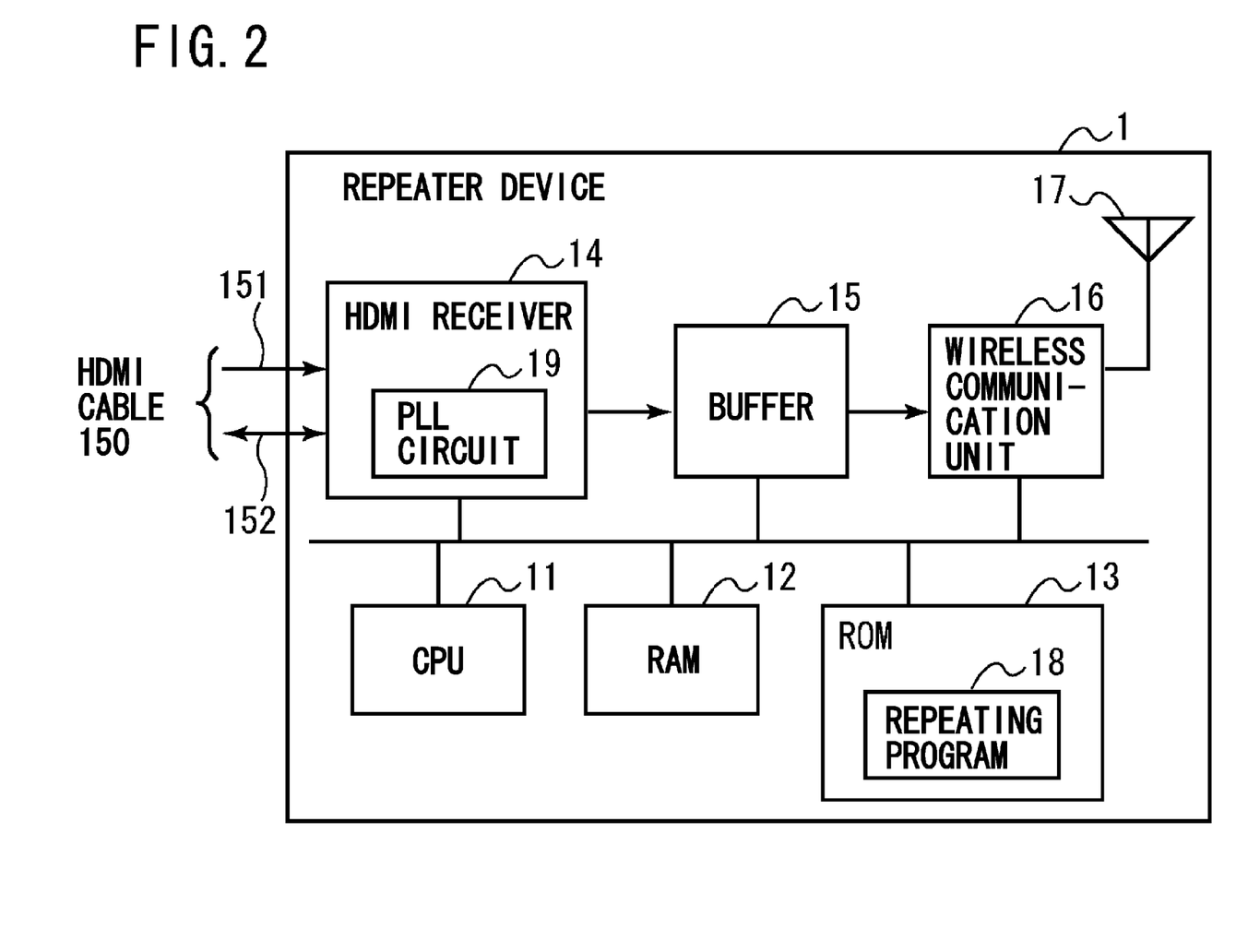
FIG. 2 is a functional block diagram illustrating a configuration of a repeater device in FIG. 1.

FIG. 2 is a functional block diagram illustrating a configuration of the repeater device 1. Referring to FIG. 2, the repeater device 1 includes a CPU (Central Processing Unit) 11, a RAM (Random Access Memory) 12, a ROM (Read Only Memory) 13, an HDMI receiver 14, a buffer 15, a wireless communication unit 16, and an antenna 17.

The CPU 11 loads a repeating program 18 stored in the ROM 13 to the RAM 12, and executes the loaded repeating program 18 to control the repeater device 1. The repeating program 18 operates the repeater device 1 such that the content data 50 transmitted from the source device is transmitted to the repeater device 2.

The HDMI receiver 14 is connected to the HDMI cable 150 that includes a TMDS (Transition Minimized Differential Signaling) channel 151 and a DDC (Display Data Channel) 152. The HDMI receiver 14 receives the content data 50 through the TMDS channel 151. The HDMI receiver 14 includes a PLL (Phased Lock Loop) circuit 19. The PLL circuit 19 is a synchronous circuit that generates a signal synchronized with a clock signal, which is transmitted together with the content data 50 through the TMDS channel 151.

The content data 50 received from the HDMI receiver 14 is temporarily stored in the buffer 15.

The wireless communication unit 16 conducts communication in conformity to the WiHD. The wireless communication unit 16 establishes the communication channel 60 using the HRP, and transmits the content data 50 stored in the buffer 15 through the communication channel 60. The wireless communication unit 16 controls directivity of the antenna 17 when conducting the communication using the HRP.

(Operating Outline of Repeater Device 1)

Before the repeater device 1 receives the content data 50 through the HDMI cable 150, authentication processing is performed between the BD player 100 and the repeater device 1 based on the HDCP. In the authentication processing, for example, key information is transferred between the BD player 100 and the repeater device 1 through the DDC 152. The BD player 100 and the repeater device 1 mutually check validity of the key information.

Before the authentication processing is ended, the repeater device 1 starts processing of establishing the communication channel 60 from the repeater device 1 to the repeater device 2 using the HRP. The repeater device 1 starts the establishment of the communication channel 60 when the PLL circuit 19 outputs a synchronous signal having the same frequency as the clock signal transmitted from the BD player 100. The repeater device 1 performs the processing of establishing the communication channel 60 in parallel with the authentication processing by the HDCP.

This enables the repeater device 1 to shorten a time from when the authentication processing is ended to when the transmission of the content data 50 through the communication channel 60 is started. The repeater device 1 can shorten a delay generated in transmitting the content data 50 transmitted from the BD player 100 to the repeater device 2.

The operation of the repeater device 1 will be described in detail below.

(Determination of Transfer Destination of HDMI Message)

The repeater device 2 (coordinator) constructs the WVAN including the repeater devices 1 and 2. The LRP is used to construct the WVAN. The repeater devices 1 and 2 shift into a pass-through mode after the construction of the WVAN. In the pass-through mode, the repeater devices 1 and 2 transfer the control information on the HDMI using the LRP. An HDMI message that is transmitted and received between the BD player 100 and the television set 200 is transferred through the repeater devices 1 and 2.

Figure 3:
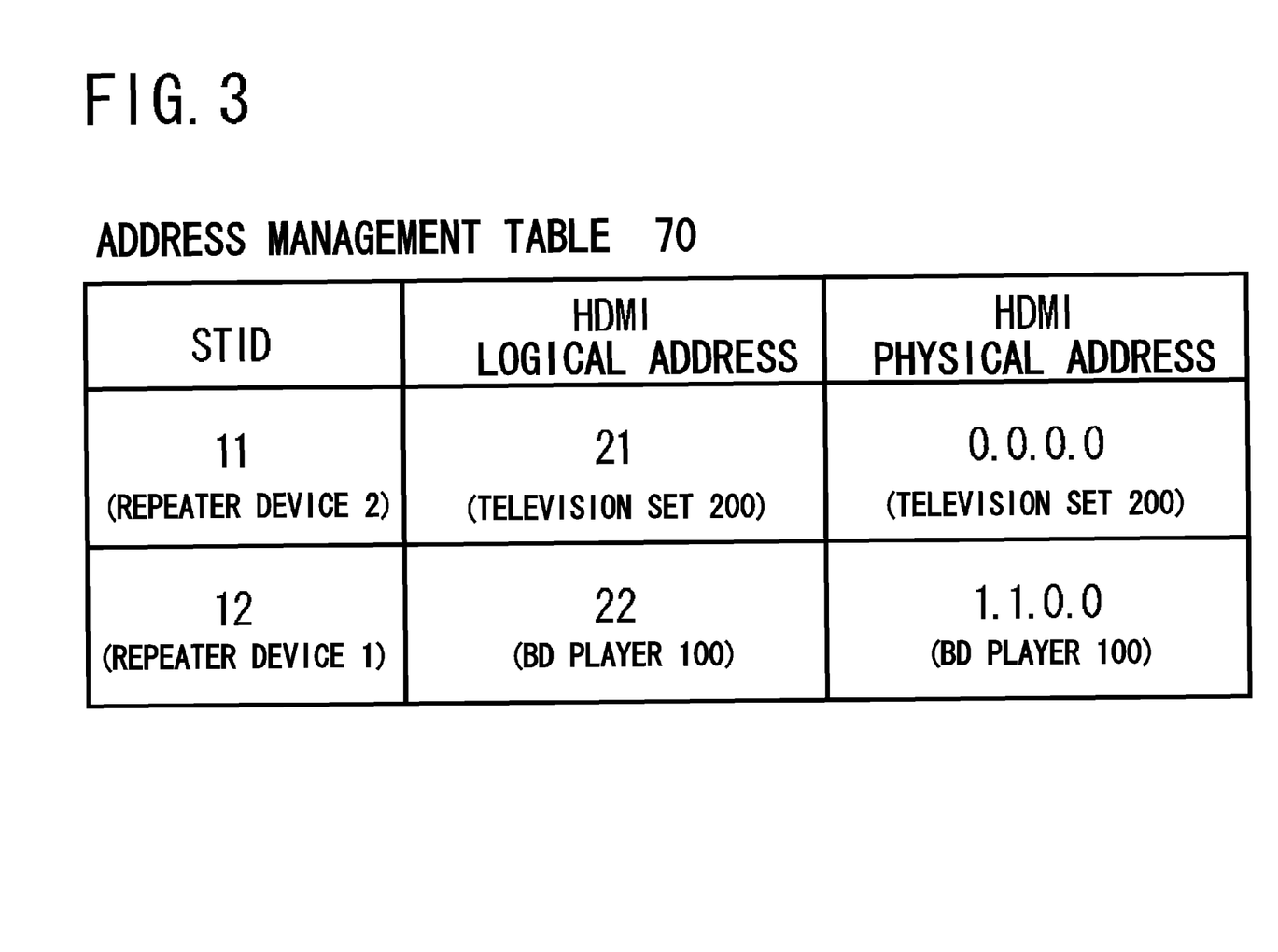
FIG. 3 is a view illustrating an address management table stored in a RAM (Random Access Memory) in FIG. 2.

FIG. 3 is a view illustrating an address management table 70 stored in the RAM 12. Referring to FIG. 3, each of the repeater devices 1 and 2 retains the address management table 70, and determines a transfer destination of HDMI control information based on the address management table 70. In the address management table 70, an STID (Station Identifier) of the repeater device is correlated with a logical address and a physical address of an HDMI device that is connected to the repeater device. The STID is identification information on the device constituting the WVAN. The STID "12" of the repeater device 1 is correlated with the HDMI logical address "22" and physical address "1.1.0.0" of the BD player 100. The STID "11" of the repeater device 2 is correlated with the HDMI logical address "21" and physical address "0.0.0.0" of the television set 200. For example, the repeater devices 1 and 2 have the HDMI physical address "1.0.0.0".

For example, in the case where the BD player 100 transmits the HDMI message having the destination of the logical address "21" and physical address "0.0.0.0" of the television set 200, the repeater device 1 refers to the address management table 70 to determine that the transfer destination of the transmitted HDMI message is the repeater device 2. Thus, even if the repeater devices 1 and 2 are interposed between the BD player 100 and the television set 200, the BD player 100 and the television set 200 can mutually transmit and receive the information on the HDMI.

(Transfer of Content Data 50)

The operation in which the content data 50 transmitted from the BD player 100 is transferred to the repeater device 2 will be described below.

It is assumed that a manipulation menu of the BD player 100 is displayed on the television set 200. The user manipulates a remote controller of the BD player 100 to issue an instruction to the BD player 100 to play back the content. The BD player 100 starts the generation of the content data 50 corresponding to the instruction content. In the case where a frame mode of the manipulation menu displayed on the television set 200 differs from a frame mode of the content data 50, the BD player 100 disconnects an HDMI link between the BD player 100 and the television set 200. Then, the new HDMI link is established in order to transmit the content data 50.

Figure 4:
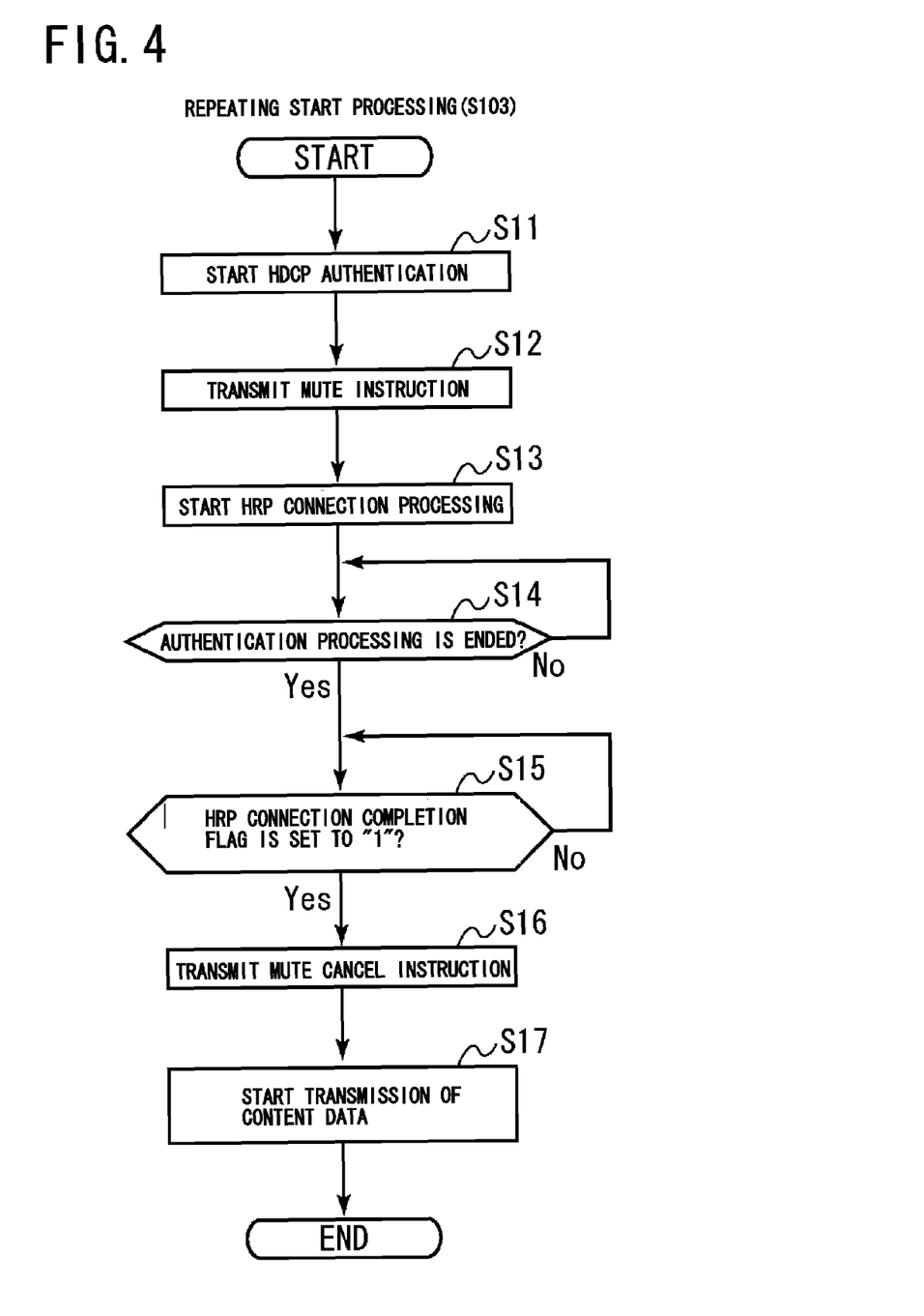
FIG. 4 is a flowchart illustrating an operation of the repeater device in FIG. 1 before the repeater device starts transmission of content data.

FIG. 4 is a flowchart of repeating start processing performed by the repeater device 1. The operation in which the repeater device 1 can transmit the content data 50 to the repeater device 2 will be described with reference to FIG. 4.

The repeater device 1 starts the authentication processing between the BD player 100 and the repeater device 1 based on the HDCP (Step S11). Specifically, the repeater device 1 receives an authentication request from the BD player 100 through the DDC 152, thereby starting the authentication processing (Step S11). In the authentication processing, the repeater device 1 and the BD player 100 exchange the key information with each other, and check the validity of the exchanged key information.

Based on the HDCP, the authentication processing is performed between the BD player 100 and the television set 200, and performed between the repeater device 2 and the television set 200.

Then, the repeater device 1 transmits mute instruction information to the repeater device 2 using the LRP (Step S12). The repeater device 2 issues a mute instruction to the television set 200 based on the mute instruction information transmitted from the repeater device 1. Even if the television set 200 receives some sort of video image data before receiving the content data 50, the television set 200 does not display the received image data in response to the mute instruction. Therefore, in the television set 200, the display of the video image independent of the content can be prevented before the video image is displayed based on the content data 50.

The repeater device 1 starts HRP connection processing after transmitting the mute instruction information (Step S13). The HRP connection processing is processing of establishing the communication channel 60 between the repeater device 1 and the repeater device 2. The HRP connection processing is started before the authentication processing is ended, and performed in parallel with the authentication processing started in Step S11. The detailed HRP connection processing is described later.

In the case where the authentication processing is ended (Yes in Step S14), the repeater device 1 checks whether the establishment of the communication channel 60 is completed (Step S15). Specifically, the repeater device 1 checks whether an HRP connection completion flag is set to "1" (Step S15). The HRP connection completion flag is information indicating whether the HRP connection processing is ended, and the HRP connection completion flag is set to "1" when the communication channel 60 is established. The HRP connection completion flag is set to "0" when the communication channel 60 is not established.

When the HRP connection completion flag is set to "0" (No in Step S15), the repeater device 1 is put into a standby state until the HRP connection completion flag is set to "1" (Yes in Step S15).

When the HRP connection completion flag is set to "1" (Yes in Step S15), the repeater device 1 transmits the mute cancel instruction information to the repeater device 2 through the LRP (Step S16). The mute cancel instruction information is transmitted to the repeater device 2 through the LRP. The repeater device 2 issues an instruction to the television set 200 to cancel the mute based on the mute cancel instruction information transmitted from the repeater device 1. Therefore, when receiving the content data 50, the television set 200 can display the content based on the content data 50. The repeater device 1 starts the transmission of the content data 50 (Step S17). In the case where the content data 50 is already stored in the buffer 15, the repeater device 1 divides the stored content data 50 to generate an HRP packet, and transmits the HRP packet through the communication channel 60.

(HRP Connection Processing)

Figure 5:
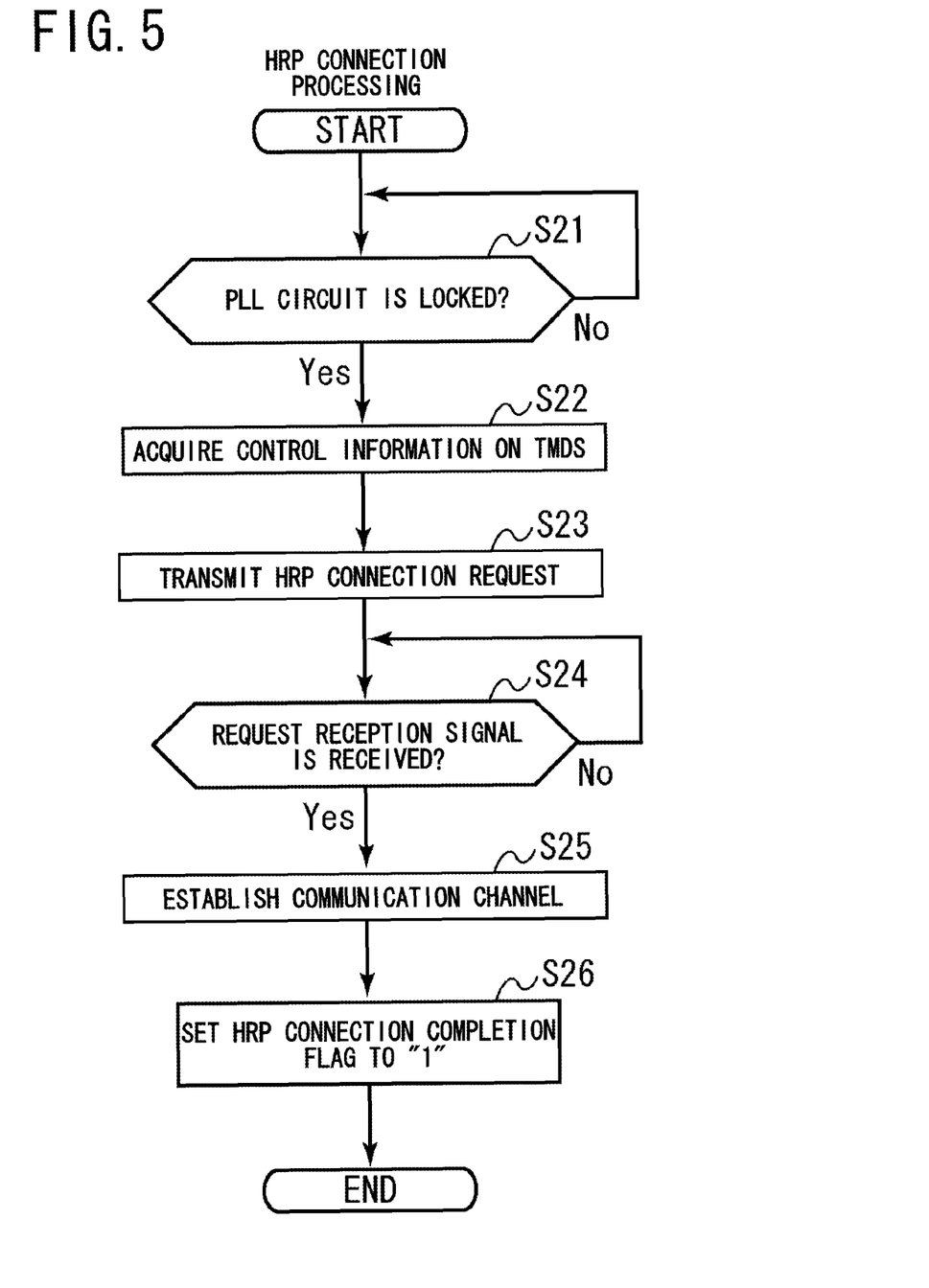
FIG. 5 is a flowchart illustrating an operation in which the repeater device in FIG. 1 establishes a communication channel by HRP.

The HRP connection processing started in Step S13 (see FIG. 4) will be described in detail below. FIG. 5 is a flowchart of the HRP connection processing performed by the repeater device 1. As described above, the HRP connection processing is performed in parallel with the authentication processing.

Referring to FIG. 5, the repeater device 1 checks whether the PLL circuit 19 is locked (Step S21). The PLL circuit 19 is locked when generating the signal having the same frequency as the clock signal transmitted through the TMDS channel 151. The BD player 100 transmits the video image signal included in the content data 50 to the repeater device 1 while synchronizing the video image signal with the clock signal. Therefore, the repeater device 1 receives the content data 50 using the signal output from the PLL circuit 19.

When the PLL circuit 19 is locked (Yes in Step S21), the repeater device 1 receives InfoFrame through the TMDS channel 151. The repeater device 1 acquires the control information on the TMDS channel 151 from the InfoFrame (Step S22). Examples of the acquired pieces of control information include a video format of the transmitted content data 50, a supported color space, a color depth, and an aspect ratio. These pieces of control information are used to determine a transmission rate and a modulation system, which are required in the communication channel 60.

The repeater device 1 transmits an HRP connection request to the repeater device 2 in order to establish the communication channel 60 (Step S23). The HRP connection request is a signal that is in conformity to the WiHD standard, and includes the STID of the repeater device 1. The HRP connection request is transmitted using the LRP.

In the case where the repeater device 1 transmits the HRP connection request to the repeater device 2, the repeater device 2 transmits a request reception signal indicating the reception of the HRP connection request to the repeater device 1 using the LRP.

When receiving the request reception signal (Yes in Step S24), the repeater device 1 controls the directivity of the antenna 17 to establish the communication channel 60 (Step S25). The processing in Step S25 is in conformity to the WiHD standard.

Specifically, the repeater device 1 controls the directivity of the antenna 17 to specify a shortest route through which the content data 50 can be transmitted from the repeater device 1 to the repeater device 2. The repeater device 1 transmits route information (such as information on the directivity of the antenna 17) necessary to implement the specified route to the repeater device 2. The repeater device 2 checks whether a transfer rate defined in the WiHD standard is ensured based on the route information transmitted from the repeater device 1, and then transmits a check result to the repeater device 1. Therefore, the communication channel 60 is established.

After establishing the communication channel 60, the repeater device 1 changes the HRP connection completion flag to "1" (Step S26). Then the repeater device 1 completes the HRP connection processing. As described above, in the case where the HRP connection completion flag is set to "1", the repeater device 1 transmits the mute cancel instruction to the repeater device 2 (Step S16 in FIG. 4), and starts the transmission of the content data 50 (Step S17).

In the embodiment, before the end of the authentication processing between the repeater device 1 and the BD player 100, the repeater device 1 starts the HRP connection processing to establish the communication channel 60. Therefore, in the repeater device 1, the time from when the authentication processing is ended to when the communication channel 60 is established can be shortened, so that the delay can be shortened when the content data 50 is transmitted to the repeater device 2 through the communication channel 60.

In the embodiment, by way of example, the HRP connection processing is performed in parallel with the authentication processing. Alternatively, the repeater device 1 may start the HRP connection processing before starting the authentication processing (Step S11). Alternatively, the repeater device 1 may start the authentication processing (Step S11) after the HRP connection processing in FIG. 5 is ended. That is, the repeater device 1 may start the HRP connection processing before the authentication processing based on the HDCP is ended. This enables the repeater device 1 to shorten the time from when the authentication processing is ended to when the transmission of the content data 50 is started.

In the embodiment, by way of example, the repeater device 1 and the BD player are separately provided and the repeater device 2 and the television set 200 are separately provided. Alternatively, the BD player 100 may be equipped with the repeater device 1. That is, the repeater device 1 may be a computer that acts as the transmitting apparatus transmitting the content data to the receiving apparatus using the WiHD. Alternatively, the television set 200 may be equipped with the repeater device 2.

In the embodiment, by way of example, the repeater device 2 transmits the content data 50 to the television set 200 through the HDMI cable 250. For example, using the WiHD, the repeater device 2 may transfer the content data 50 to another device in conformity to the WiHD standard.

In the embodiment, by way of example, the repeater devices 1 and 2 conduct the communication with each other using the WiHD. Alternatively, the repeater devices 1 and 2 may use at least two wireless communications. In this case, the repeater device 1 establishes the communication channel 60 by one wireless communication using another wireless communication, and transmits the content data 50 through the communication channel 60.

In the embodiment, by way of example, the BD player 100 and the television set 200 are in conformity to the HDMI. Alternatively, in the content transfer system 300, a device that transmits and receives the uncompressed content data or compressed content data may be used as the BD player 100 and television set 200.

The embodiment of the present invention is described above only by way of example. Therefore, the present invention is not limited to the embodiment, but various modifications can be made without departing from the scope of the present invention.

What is claimed is:

1. A transmitting apparatus that transmits data to a receiving apparatus using first and second wireless communications, the transmitting apparatus comprising:
    a receiver that receives content data transmitted from a source device in conformity to a predetermined standard;
    an authentication unit that performs authentication processing between the source device and the transmitting apparatus in order to receive the content data from the source device;
    a channel establishing unit that starts processing of establishing a communication channel from the transmitting apparatus to the receiving apparatus by the second wireless communication using the first wireless communication before the authentication unit ends the authentication processing; and
    a transmitter that transmits the content data received by the receiver to the receiving apparatus through the communication channel established by the channel establishing unit,
    wherein the processing of establishing the communication channel is performed in parallel with the authentication processing performed by the authentication unit.

2. The transmitting apparatus according to claim 1, wherein
    the channel establishing unit includes a flag setting unit that sets a completion flag indicating the establishment of the communication channel when the establishment of the communication channel is completed, and
    the transmitter starts the transmission of the content data through the communication channel when the flag setting unit sets the completion flag.

3. The transmitting apparatus according to claim 1, wherein
    the source device transmits the content data to the transmitting apparatus while synchronizing the content data with a clock signal, the receiver includes a synchronous circuit that generates a signal synchronized with the clock signal before the source device transmits the content data, and the channel establishing unit starts the establishment of the communication channel when the signal output from the synchronous circuit is synchronized with the clock signal.

4. A method for controlling an transmitting apparatus that transmits data to a receiving apparatus using first and second wireless communications, the method comprising the steps of:

receiving content data transmitted from a source device in conformity to a predetermined standard;

performing authentication processing between the source device and the transmitting apparatus in order to receive the content data from the source device;

starting processing of establishing a communication channel from the transmitting apparatus to the receiving apparatus by the second wireless communication using the first wireless communication before the authentication processing is ended between the source device and the transmitting apparatus; and transmitting the content data received by the receiver to the receiving apparatus through the established communication channel, wherein the processing of establishing the communication channel is performed in parallel with the authentication processing between the source device and the transmitting apparatus.

5. A non-transitory, computer readable medium having stored thereon a program causing a computer, which acts as a transmitting apparatus that transmits data to a receiving apparatus using first and second wireless communications, to perform the steps of:

receiving content data transmitted from a source device in conformity to a predetermined standard;

performing authentication processing between the source device and the transmitting apparatus in order to receive the content data from the source device;

starting processing of establishing a communication channel from the transmitting apparatus to the receiving apparatus by the second wireless communication using the first wireless communication before the authentication processing is ended between the source device and the transmitting apparatus; and transmitting the content data received by the receiver to the receiving apparatus through the established communication channel, wherein the processing of establishing the communication channel is performed in parallel with the authentication processing between the source device and the transmitting apparatus.

* * * * *